United States Patent [19]

Eguchi et al.

[11] Patent Number: 4,585,841

[45] Date of Patent: Apr. 29, 1986

[54] TRANSPARENT RESIN MATERIAL CONTAINING METALLIC ATOMS BONDED TO PENDENT CARBOXYLIC ACID GROUPS

[75] Inventors: Shuji Eguchi; Noriaki Taketani, both of Hitachi; Hideki Asano, Mito; Motoyo Wajima, Hitachi, all of Japan

[73] Assignee: Hitachi, Ltd., Tokyo, Japan

[21] Appl. No.: 547,585

[22] Filed: Nov. 1, 1983

[30] Foreign Application Priority Data

Nov. 1, 1982 [JP] Japan ................................ 57-190875
Mar. 4, 1983 [JP] Japan ................................ 58-34379
Jul. 27, 1983 [JP] Japan ................................ 58-135881

[51] Int. Cl.$^4$ ..................... C08F 30/04; C08F 130/04; C08F 230/04
[52] U.S. Cl. ................................................ 526/240
[58] Field of Search ................. 526/240; 523/442; 524/779, 780

[56] References Cited

U.S. PATENT DOCUMENTS 3,886,125  5/1975  Chromecek .................... 526/240
3,920,605  11/1975 Sato et al. .................... 526/240

FOREIGN PATENT DOCUMENTS 2480948  3/1981  France ........................ 526/240
57-5705   1/1982  Japan ......................... 526/241
57-28116  2/1982  Japan ......................... 526/241

Primary Examiner—Joseph L. Schofer
Assistant Examiner—Peter F. Kulkosky
Attorney, Agent, or Firm—Antonelli, Terry & Wands

[57] ABSTRACT

A transparent resin material containing metallic atoms (except for alkali metals) which are ionic-bonded to a vitreous polymeric material constituting the substance of said resin material, in an amount of at least 8% by weight based on the total weight of the resin material, said resin material having a transparency of at least 80% in terms of a light transmittance, and a refractive index $n_D^{25}$ of at least 1.55.

30 Claims, No Drawings

TRANSPARENT RESIN MATERIAL CONTAINING METALLIC ATOMS BONDED TO PENDENT CARBOXYLIC ACID GROUPS

BACKGROUND OF THE INVENTION

The present invention relates to a transparent resin material containing metallic atoms. More specifically, the present invention relates to a resin material having excellent transparency and a high refractive index as well as to a process for producing the resin.

BACKGROUD ARTS

Resins having excellent transparency and high refractive indexes are being increasingly used widely as optical parts such as lenses and the like, because of their advantages of lightness, good moldability and high safety. As such resins, there are polymethyl methacrylates already in use as spectacles lens and the like, polydiethylene glycol bisallylcarbonates, etc. However, because these resins are low in refractive index ($n_D \approx 1.50$), when they are used as a lens for camera, it is necessary to make the radius of curvature of the lens small, whereby the lens eventually possesses a larger aberration than inorganic glasses and resultantly it is difficult to obtain a lens of large aperture and high magnification. As very familiar resins of high refractive indexes, there are polycarbonates ($n_D^{25} = 1.58$) polystyrenes ($n_D^{25} = 1.59$), etc. Moreover, these resins are liable to cause double refraction and, because of non-uniformity of optical characteristics, can not be used as a material for lenses for camera.

A process for incorporating a heavy metal into a resin is one effective method for increasing the refractive index of the resin. As prior arts for transparent resins containing heavy metals, U.S. Pat. Nos. 4,129,524 and 4,182,821, etc. disclose lead-containing shields for radiation. Further, The Quarterly Report of Government Industrial Research Institute, Osaka, 27, pp 129–141 (1976), etc. describe transparent resins containing metal salts of monoalkyl itaconates. However, these transparent resins have $n_D^{25}$ of 1.57 at best and do not reach or exceed $n_D^{25}$ of 1.60.

Arts concerning metal-containing plastic lens materials having $n_D^{25}$ of 1.60 or higher are disclosed in Japanese Patent Application Kokai (Laid-open) Nos. 147101/1981, 5705/1982, 28115/1982 and 28116/1982, etc. These publications propose incorporation of metals into resins by homopolymerization of a monomer containing a metal in the form of covalent bonding or of a metal salt of a double bond-containing organic carboxylic acid or by copolymerization of said monomer or said metal salt with another reactive monomer. However, when a metal-containing monomer is copolymerized with a copolymerizable monomer such as styrene, a halogenated styrene or the like, as the amount of the metal-containing monomer increases, in general the copolymer obtained loses optical transparency and becomes white and semi-transparent or non-transparent. Further, it is known from the aforementioned Quarterly Report that, among metal salts of organic carboxylic acids, for example, barium methacrylate and lanthanum methacrylate are insoluble in copolymerizable monomers or are even a white powder which does not melt, and therefore, are not appropriate as materials for transparent resins. Hence, the above arts of increasing the refractive index and enhancing various characteristics of a resin by the use of a metal-containing monomer have large limitations.

Further, in the arts disclosed in the aforementioned Japanese Patent Application Kokai (Laid-open) Nos. 147101/1981 and 5705/1982, many reaction steps are required for production of a novel monomer containing a metal. In these reactions, unreacted materials tend to remain as impurities making the production of a uniform monomer difficult. Hence, a resin produced from such a monomer has no sufficient transparency and lacks in optical homogeneity.

Under such circumstances, the present inventors made extensive studies on a polymerized resin containing metallic atoms necessary to give the resin a high refractive index and yet having high optical transparency, as well as on a process for producing the resin. As a result, it was found out that a desired resin with excellent properties can be produced. Based on this finding, the present invention has been completed.

OBJECTS OF THE INVENTION

An object of the present invention is to provide a novel transparent resin material containing metallic atoms.

Another object of the present invention is to provide a process for producing a novel transparent resin material containing metallic atoms.

Still another object of the present invention is to provide a resin material having high optical transparency and a high refractive index, specifically a refractive index $n_D^{25}$ of 1.55 or above, particularly 1.60 or above.

A further object of the present invention is to provide optical parts or materials such as a light waveguide as a photosignal transmission means, an optical fiber, a varnish composition for coating film and the like.

Other objects and advantages of the present invention will be made apparent by the following description.

SUMMARY OF THE INVENTION

The transparent resin material provided by the present invention is a transparent resin material containing metallic atoms (except for alkali metals) which are ionic-bonded to a vitreous polymeric material constituting the substance of said resin material, in an amount of at least 8% by weight, preferably 10 to 40% by weight based on the total weight of the resin material, said resin material having a transparency of at least 80%, preferably 85% or above, in terms of a light transmittance ratio, and a refractive index $n_D^{25}$ of at least 1.55, preferably 1.60 or above.

More specifically, the transparent resin material provided by the present invention is a transparent resin material containing metallic atoms therein, which comprises a vitreous copolymer composed of the following recurring units:

(a) a residue of a copolymerizable vinyl monomer;
(b) a residue of a carboxylic acid polymer, at least one of the carboxylic groups of the polymer being ionic-bonded through a metallic atom to a carboxylic group of an aromatic carboxylic acid;
(c) a residue of a carboxylic acid having least one free carboxylic group; and
(d) a residue of a carboxylic acid polymer which is cross-linked by ion-linkage through a metallic atom.

In the above transparent resin material, the residue of the polymerizable vinyl monomer (a) may be represented by the general formula

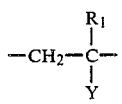 [1]

wherein $R_1$ represents a hydrogen atom or a methyl group; and Y represents (1)

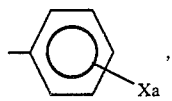

in which X is a hydrogen atom, chlorine atom, bromine atom, iodine atom, methyl group, methoxy group, amino group, nitoro group, phenyl group or phenoxy group, and a is an integer of 1–5; (2)

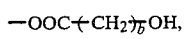

in which b is an integer of 1–5; or (3)

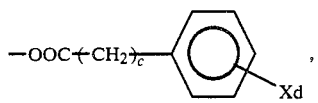

in which X is as defined above, c is an integer of 0–1, and d is an integer of 1–5; the residue of the carboxylic acid polymer (b) may be represented by the general formula

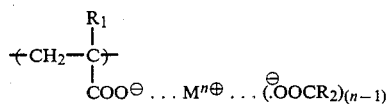 [2]

wherein M represents a metallic atom, $R_1$ represents a hydrogen atom or a methyl group, $R_2$ represents a group having an aromatic group and n represents oxidation number of the metal; the residue of the carboxylic acid having at least one free carboxylic acid (c) may be represented by the general formula

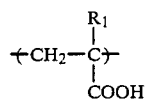 [3]

wherein $R_1$ is as defined above; and the residue of the carboxylic acid polymer (d) may be represented by the general formula

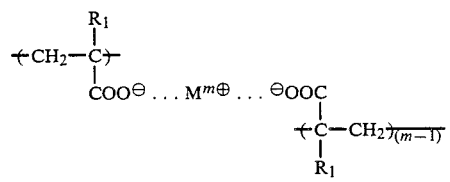 [4]

wherein $R_1$ and M are as defined above, and m is an oxidation number of the metal.

In the above transparent resin material containing metallic atoms according to the present invention, the proportion of metallic atoms is 5 to 50% by weight, preferably 10 to 40% by weight. The proportions of the four residue components represented by the general formulas [1], [2], [3] and [4] are 10 to 80% by weight, 10 to 89% by weight, 1 to 20% by weight and 0 to 20% by weight, respectively.

The above transparent resin material according to the present invention can be produced by the following process (1).

(1) A process for producing a transparent resin material containing metallic atoms which comprises (i) a step for producing a metal-containing monomer composition comprising reacting at least one aromatic carboxylic acid, and at least one carboxylic acid with a metal compound, and (ii) a step for copolymerizing the metal-containing monomer composition thus obtained and at least one copolymerizable vinyl monomer.

The transparent resin material of the present invention can also be produced by the following process (2).

(2) A process for producing a transparent resin material containing metallic atoms which comprises effecting copolymerization of a mixture of (a) at least one copolymerizable vinyl monomer,
(b) at least one metal salt of an aromatic carboxylic acid,
(c) at least one metal salt of a carboxylic acid, and
(d) at least one carboxylic acid.

The process (2) is more specifically: a process for producing a transparent resin material containing metallic atoms which comprises effecting copolymerization of a mixture of at least one monomer represented by the general formula [I]

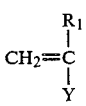 [I]

wherein $R_1$ represents a hydrogen atom or a methyl group; and Y represents (1)

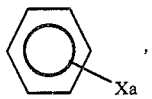

in which X is a hydrogen atom, chlorine atom, bromine atom, iodine atom, methyl group, methoxy group, amino group, nitoro group, phenyl group or phenoxy group, and a is an integer of 1–5; (2)

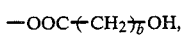

in which b is an integer of 1–5; or (3)

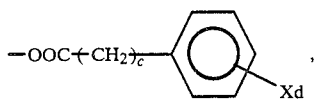

in which X is as defined above, c is an integer of 0-1, and d is an integer of 1-5, at least one monomer represented by the general formula [II]

$$(R_2COO)_nM \qquad [II]$$

wherein M represents a metal atom, $R_2$ represents a group having at least one aromatic ring and n represents the oxidation number of the metal, at least one monomer represented by the general formula [III]

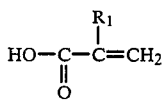
$$M+O-\underset{\underset{O}{\|}}{C}-\underset{\underset{}{|}}{\overset{R_1}{C}}=CH_2)_m \qquad [III]$$

wherein M is as defined above, $R_1$ represents a hydrogen atom or a methyl group and m represents the oxidation number of the metal, and at least one monomer represented by the general formula [IV]

$$HO-\underset{\underset{O}{\|}}{C}-\underset{\underset{}{|}}{\overset{R_1}{C}}=CH_2 \qquad [IV]$$

wherein $R_1$ is as defined above.

Our study showed that a resin of high optical transparency can not be obtained by copolymerization of one copolymerizable monomer and one metal salt of an organic carboxylic acid such as, for example, methacrylic acid, but such a resin can be obtained by copolymerization of said copolymerizable monomer and metal salts of at least two kinds of organic carboxylic acids (said organic carboxylic acid plus other kind of organic carboxylic acid).

Our study further showed that, when the other kind of organic carboxylic acid to be used together with methacrylic acid or the like is a saturated or unsaturated carboxylic acid having a long chain aliphatic hydrocarbon group, a resulting copolymer resin has a low refractive index and poor heat resistance causing discoloration to yellow and, when a saturated carboxylic acid and/or an unsaturated carboxylic acid each having a not too long chain length and containing at least one aromatic ring is used together with methacrylic acid or the like, a copolymer resin having a refractive index $n_D^{25}$ of 1.60 or above can be obtained.

Thus, it was found out that a metal salt of an aromatic carboxylic acid is effective in increasing the refractive index of a transparent resin. However, a transparent resin produced by heat-curing the above mentioned monomers has no sufficient transparency. That is, when a copolymerizable monomer and metal salts of carboxylic acid, for example, methacrylic acid and/or acrylic acid and of an aromatic carboxylic acid are copolymerized, if these metal salts are such that said carboxylic acids are combined with a metal in equivalent moles relative to the oxidation number of the metal (ml moles of carboxylic acids are combined with l moles of a metal having a valency of m), the copolymer resin obtained contain fine particles, whereby a transmitted light is scattered reducing transparency. Then, it was further found that this problem can be solved by using carboxylic acids to be ionic-bonded to a metal in an amount more than equivalent moles relative to the oxidation number of the metal.

The amount of said carboxylic acid, for example, methacrylic acid and/or acrylic acid, differs by the kinds of a metal and an aromatic carboxylic acid. It is preferable, however, that the carboxylic acid be used in such an amount that the total mole number of aromatic carboxylic acid and carboxylic acid becomes 1.03- to 3.0-fold, particularly 1.05- to 2.0-fold relative to the total oxidation number of the metal.

The vinyl monomer represented by the general formula [I], $$CH_2=\underset{\underset{Y}{|}}{\overset{\overset{R_1}{|}}{C}},$$

which is used in the present invention is a monomer selected from the group consisting of styrene, styrene derivatives, hydroxyalkyl methacrylates, hydroxyalkyl acrylates, phenyl methacrylate and derivatives thereof, phenyl acrylate and derivatives thereof, benzyl methacrylate and derivatives thereof, and benzyl acrylate and derivatives thereof. The styrene derivatives include epoxy group-containing styrenes such as styrene oxide and the like, nucleus-substituted styrenes such as nitrated styrene, halogenated styrenes, amino-substituted styrenes, carboxylated styrenes and the like. The hydroxyalkyl methacrylates include hydroxyethyl methacrylate, hydroxypropyl methacrylate, hydroxychloropropyl methacrylate, etc. The hydroxyalkyl acrylates include hydroxyethyl acrylate, hydroxypropyl acrylate, hydroxychloropropyl acrylate, etc. The phenyl methacrylate derivatives include nucleus-halogen substituted phenyl methacrylates, etc. The phenyl acrylate derivatives include nucleushalogen substituted phenyl acrylates, etc. The benzyl methacrylate derivatives include nucleus-halogen substituted benzyl methacrylates, etc. The benzyl acrylate derivatives include nucleus-halogen substituted benzyl acrylates, etc.

These vinyl monomers can be used individually or in combination of two or more.

The metal salt of an aromatic carboxylic acid which is used in the present invention includes metal salts of carboxylic acids, for example, represented by the following general formulas.

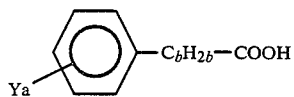
[V]

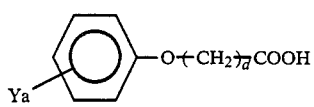
[VI]

[VII]

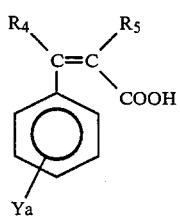
[VIII]

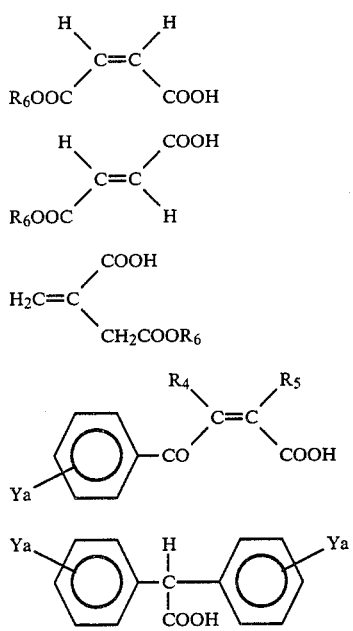

In the above formulas [V] to [XIII], Y is a hydrogen, chlorine, bromine or iodine atom, or a methoxy, amino, nitro or cyano group; $R_3$ is an alkyl, alkenyl, aryl, aralkyl or cyclohexyl group; $R_4$ and $R_5$ individually are a hydrogen, chlorine or bromine atom, or a methyl or cyano group; $R_6$ is a phenyl, benzyl or phenetyl group; a is 1 or 2; b is 0 to 5; and d is 1 to 5.

Examples of the formula [V] include benzoic acid, phenylacetic acid, hydrocinnamic acid, 4-phenylbutyric acid, 5-phenylvaleric acid, o-, m- or p-chlorophenylacetic acid, 2-phenylpropionic acid, 2-phenyl-n-butyric acid, 3-phenyl-n-butyric acid, etc. Examples of the formula [VI] include phenoxyacetic acid, 3-phenoxypropionic acid, o- or p-chlorophenoxyacetic acid, etc. Examples of the formula [VII] include monoethyl phthalate, monobenzyl phthalate, monoallyl phthalate, monovinyl phthalate, monocyclohexyl phthalate, monomethyl terephthalate, monoethyl terephthalate, monocyclohexyl terephthalate, etc. Examples of the formula [VIII] include cinnamic acid, α-methylcinnamic acid, β-methylcinnamic acid, α-cyanocinnamic acid, etc. Examples of the formula [IX] include monophenyl maleate, monobenzyl maleate, etc. Examples of the formula [X] include monophenyl fumarate, monobenzyl fumarate, etc. Examples of the formula [XI] include monophenyl itaconate, monobenzyl itaconate, etc. Examples of the formula [XII] include 3-benzoylacrylic acid, etc. Examples of the formula [XIII] include diphenylacetic acid, bis-(4-methoxyphenyl)acetic acid, etc. These acids can be used individually or in combination of two or more. Of these acids, organic carboxylic acids having both aromatic ring and double bond can form three-dimensional structures in respective copolymers, through ionic bonding with a metal, reaction of the double bond and incorporation into high molecular main chain.

The carboxylic acid to be used together with the above saturated and/or unsaturated aromatic carboxylic acid is preferably methacrylic acid and/or acrylic acid.

For the metal compound used in the present invention, there can be used oxides, hydroxides, chlorides, nitrates, acetates and carbonates of Pb, Ba, Sr, Zn, Sn, Sb, Ca, La, Ti, Zr, Ta, Th, Nb, Tl, Ge, Cs, etc. Of these, particularly preferable are compounds of Pb, Ba, La, Sr, Tl, Sn and Cs.

Metal salts of carboxylic acids produced from these metal compounds can be used individually or in combination of two or more.

Above are the components constituting the metalcontaining transparent resin material of the present invention. The processes for producing the resin material of the present invention from these components will be explained below in detail.

In a process (1), at least one copolymerizable vinyl monomer, at least one aromatic carboxylic acid and at least one carboxylic acid and a metal compound are mixed in a predetermined proportion. This mixture is subjected to reaction with stirring for 3 to 24 hr at 20° to 100° C., preferably 30° to 70° C. Upon completion of the reaction, the reaction liquid becomes a clear uniform solution. At this time, the amounts of the carboxylic acids and the metal compound used differ by their kinds. Accordingly, if metal salts of carboxylic acids are formed in an excessive amount, a precipitate appears in the reaction vessel, and in this case, it is necessary to filter the liquid after reaction to make the liquid clear. Further, because the liquid after reaction contains by-products, water, unreacted materials, etc., it is preferable to remove them from the liquid under reduced pressure preferably of 100 mmHg or lower at 20° to 60° C. Thus, a monomer composition can be obtained. To the monomer composition, is added a polymerization initiator. The resulting mixture is heated or exposed to an ultraviolet light for polymerization (curing), whereby a transparent resin material containing metallic atoms according to the present invention is produced.

In another process (2), at least one metal salt of an aromatic carboxylic acid and at least one metal salt of carboxylic acid are admixed with at least one copolymerizable vinyl monomer and at least one carboxylic acid to form a monomer composition. To the monomer composition, is added a polymerization initiator. The resulting mixture is heated or exposed to an ultraviolet light for polymerization (curing), whereby a transparent resin material containing metallic atoms according to the present invention is produced. The metal salts of the carboxylic acid and aromatic carboxylic acid used in the above process (2) are produced by known processes such as, for example, the process disclosed in the aforementioned U.S. Pat. No. 4,129,524. That is, the above carboxylic acids are dissolved in a concentration of, for example, 5 to 50%, in a polar solvent such as water, an alcohol or the like or in a non-polar solvent such as benzene, toluene or the like. Then, to the resulting solution being stirred at 20° to 100° C., preferably 30° to 70° C. is slowly added a metal compound such as an oxide, a hydroxide, a chloride, a nitrate, an acetate, a carbonate or the like of a metal, in the form of a solid, solution or slurry. The resulting mixture is subjected to reaction for 1 to 10 hr. Metal salts of the above carboxylic acids are formed in the form of a precipitate or solute. The precipitate is filtered and dried at 20° to 80° C. under reduced pressure. The metal salts in the form of solute can be separated by distilling off the solvent under reduced pressure. A proportion of the metal compound to be added is 33 to 97% mole, preferably 50 to 95% mole relative to the moles of the total carboxylic acids.

The temperature for thermal polymerization is 50° to 150° C., preferably 60° to 120° C. and the polymerization time is 2 to 24 hr, preferably 4 to 15 hr. The polymerization by irradiation of an ultraviolet light is conducted by employing, for example, a high pressure mercury lamp of 500 W to several kW and an exposure time of several tens of seconds to several tens of minutes.

As the polymerization initiator used in thermal polymerization of the monomer composition, ordinary radical polymerization initiators can be employed such as benzoyl peroxide, lauroyl peroxide, diisopropyl peroxydicarbonate, dimyristyl peroxydicarbonate, azobisisobutyronitrile, etc. As the polymerization initiator used in curing by an ultraviolet light, there can be used benzoin isopropyl ether, benzoin ethyl ether, benzoin isobutyl ether, α-allybenzoin, α-methylbenzoin, benzophenone, benzyl-2-ethylanthraquinone, etc. These polymerization initiators for ultraviolet light curing can be used singly and also in combination with a polymerization initiator for thermal curing. The amount of the polymerization initiator used is 0.05 to 5 parts by weight, preferably 0.1 to 3 parts by weight relative to 100 parts by weight of the monomer composition. The proportion of each monomer component differs by the intended application of a transparent resin material to be produced, but the proportion of monomers represented by the aforementioned general formulas [I] to [IV] is 10 to 80 : 5 to 80 : 5 to 70 : 1 to 12, on weight basis.

The transparent resin material containing metallic atoms, thus obtained according to the present invention, has excellent transparency and a high refractive index and moreover is vitreous. Accordingly, it is very useful as optical parts or materials for lenses, light waveguides as photosignal transmission means, optical fibers, varnish compositions for coating films, etc.

A plastic lens according to the present invention can be produced by, for example, mixing the aforementioned monomer composition and a polymerization initiator, pouring the mixture into a glass or metal mold with a gasket and curing it by means of heat, an ultraviolet light, etc. It is also possible to cure the monomer composition by exposure to an ultraviolet light without adding the polymerization initiator.

Production of an optical transmission material from the transparent resin material of the present invention is made by processing the resin material into shapes of a fiber, a pole, a sheet, etc. depending upon intended applications. A plastic optical fiber is produced by extruding a mixture of a monomer composition and a polymerization initiator for the production of a transparent resin material containing metallic atoms of the present invention (which later becomes a core part of an optical fiber) through a nozzle of 50 μm to 2 mm diameter in vacuum or a nitrogen gas atmosphere, then curing the extrudate by the use of heat or an ultraviolet light, and finally passing the resulting cured extrudate through a metal resin such as a polymethyl methacrylate, a polyfluoroalkyl methacrylate or the like to form a clad part on the core part. An optical fiber can also be produced by another method, wherein a pole-shaped prefiber having a diameter of several millimeters to several tens of millimeters is formed according to the above method and thereafter is spun into a fiber. A light waveguide is produced as follows. On the surface of a flat sheet of a metal-containing transparent resin material containing an aromatic carboxylic acid according to the present invention, is formed a thin film mask made of a metal or an organic substance. Then, the flat sheet and mask are immersed in a solvent such as an alcohol, a ketone, an ether or the like, whereby only the aromatic carboxylic acid diffuses into the solvent and the distribution of refractive index is caused and thus a light waveguide part is formed. Thereafter, the thin film mask of a metal or an organic substance is removed by the use of an acid, an organic solvent or the like.

A coating composition of the present invention can be produced by mixing a monomer composition as mentioned previously and a polymerization initiator and, a solvent, if necessary.

EMBODIMENTS OF THE INVENTION

The present invention will be explained more specifically below with reference to examples and comparative examples, however, is by no means restricted by these Examples. Resins obtained in the examples and the comparative examples were tested by the following test methods.

(1) Refractive Index ($n_D^{25}$) and Abbe Number

Using an Abbe refractometer, refractive indexes and Abbe numbers of resin samples at 25° C. were measured. As a boundary liquid, α-monobromonaphthalene was used.

(2) Light Transmittance

Using a haze meter manufactured by Suga Shikenki K.K., light transmittance ratio was measured for test pieces of 2 mm thickness.

EXAMPLE 1

27 Parts by weight (parts by weight is applied hereinafter) of styrene, 16 parts of hydrocinnamic acid, 21 parts of methacrylic acid and 36 parts of PbO were mixed. The mixture was subjected to reaction for 10 hr at 60° C. to obtain a transparent and clear monomer composition containing Pb. Then, to 100 parts of this monomer composition was added 0.5 part of diisopropyl peroxycarbonate as a polymerization initiator, and they were mixed. The mixture was poured into a mold made from two glass sheets and a gasket, and was kept for 5 hr at 50° C. and further for 2 hr at 100° C. for thermal curing. Thereafter, a transparent polymer was taken out of the mold. The polymer had such optical properties as refractive index $n_D^{25}$ of 1.624 and an Abbe number of 31 and accordingly has good practical usability as a plastic lens. The polymer had a light transmittance of 90%.

COMPARATIVE EXAMPLE 1

29 Parts of styrene, 34 parts of methacrylic acid and 37 parts of PbO were mixed and subjected to reaction for 10 hr at 60° C. to obtain a transparent and clear monomer composition. To 100 parts of this monomer composition kept at 60° C. (lead methacrylate precipitates at the normal temperature) was added 0.5 part of lauroylperoxide as a polymerization initiator and they were mixed. The mixture was then poured into the same mold as used in Example 1, and was kept for 5 hr at 70° C. and further for 2 hr at 120° C. for thermal curing. Thereafter, a polymer was taken out of the mold. The polymer was white and semi-transparent and unusable as a plastic lens.

EXAMPLE 2

17 Parts of styrene, 14 parts of cinnamic acid and 29 parts of methacrylic acid were mixed and raised to 60°

C. Thereto was slowly added 40 parts of PbO and reaction was conducted for 15 hr at that temperature to obtain a transparent and clear monomer composition. To 100 parts of this monomer composition was added 0.3 part of diisopropyl peroxycarbonate as a polymerization initiator and they were mixed. The mixture was molded in the same manner as in Example 1. The polymer obtained was transparent and had such optical properties as refractive index $n_D^{25}$ of 1.652 and an Abbe number of 26. The polymer had a light transmittance of 85%.

EXAMPLE 3

35 Parts of 2,6-dichlorostyrene, 14 parts of n-phenyl-butyric acid and 17 parts of methacrylic acid were mixed. After the mixture had been raised to 45° C., 34 parts of anhydrous barium hydroxide [Ba(OH)$_2$] was added thereto and the whole mixture was subjected to reaction of 10 hr. The liquid temperature was cooled down to room temperature and the liquid was filtered. From the filtrate, water was removed under reduced pressure, whereby a monomer composition was obtained. To 100 parts of this monomer composition was added 0.3 part of diisopropyl peroxycarbonate as a polymerization initiator and they were mixed. The mixture was poured into a glass mold and kept for 5 hr at 50° C. and further for 2 hr at 90° C. to obtain a light yellow and transparent polymer. The polymer had such optical properties as refractive index $n_D^{25}$ of 1.613 and an Abbe number of 33. Its light transmittance was 88%.

EXAMPLE 4

40 Parts of mixed chlorostyrene (ortho/-para=60/40), 23 parts of o-chlorophenylacetic acid and 20 parts of methacrylic acid were mixed and kept at 45° C. Thereto was added 17 parts of lanthanum hydroxide [La(OH)$_2$] and they were subjected to reaction of 8 hr. The reaction liquid was cooled down to room temperature and filtered. From the filtrate, water was removed under reduced pressure, whereby a monomer composition was obtained. To 100 parts of this monomer composition was added 0.3 part of diisopropyl peroxycarbonate and they were mixed. The mixture was kept for 6 hr at 55° C. and further for 3 hr at 90° C. to obtain a transparent polymer. The polymer had such optical properties as refractive index $n_D^{25}$ of 1.620 and an Abbe number of 35. Its light transmittance was 89%.

COMPARATIVE EXAMPLE 2

45 Parts of mixed chlorostyrene (ortho/-para=60/40), 36 parts of methacrylic acid and 19 parts of La(OH)$_3$ were mixed and subjected to reaction for 8 hr at 45° C. Molding was conducted in the same manner as in Example 4 to obtain a polymer. The polymer had terrible haze and was unusable as a plastic lens. Its light transmittance was 30%.

EXAMPLE 5

20 Parts of styrene, 7 parts of mixed chlorostyrene (ortho/para=60/40), 16 parts of hydrocinnamic acid, 21 parts of methacrylic acid and 36 parts of PbO were mixed and subjected to reaction for 10 hr at 50° C. to obtain a transparent and clear monomer composition containing lead. Molding was conducted in the same manner as in Example 1. The polymer obtained had such optical properties as refractive index $n_D^{25}$ of 1.626 and an Abbe number of 31. Its light transmittance was 90%.

EXAMPLE 6

37 Parts of mixed chlorostyrene (ortho/-para=60/40), 18 parts of 3-phenyl-n-butyric acid, 20 parts of acrylic acid and 25 parts of PbO were mixed and subjected to reaction for 10 hr at 50 ° C. to obtain a transparent and clear monomer composition containing lead. Molding was conducted in the same manner as in Example 1. The polymer obtained was transparent and had such optical properties as refractive index $n_D^{25}$ of 1.609 and an Abbe number of 33. Its light transmittance was 89%.

EXAMPLE 7

29 Parts of styrene, 8 parts of cinnamic acid, 25 parts of methacrylic acid and 4 parts of monomethyl itaconate were mixed. After the mixture had been raised to 60° C., 34 parts of PbO was added thereto slowly and reaction was conducted for 10 hr, whereby a transparent and clear monomer composition containing lead was obtained. This monomer composition was subjected to molding in the same manner as in Example 1. The polymer obtained had such optical properties as refractive index $n_D^{25}$ of 1.637 and an Abbe number of 29. Its light transmittance was 87%.

EXAMPLE 8

28 Parts of mixed chlorostyrene (ortho/-para=60/40), 18 parts of 3-phenoxypropionic acid, 21 parts of methacrylic acid and 33 parts of PbO were mixed and subjected to reaction for 10 hr at 50° C. to obtain a transparent and clear monomer composition containing lead. This monomer composition was subjected to molding in the same manner as in Example 1. The polymer obtained had such optical properties as refractive index $n_D^{25}$ of 1.622 and an Abbe number of 32. Its light transmittance was 89%.

EXAMPLE 9

32 Parts of 2,6-dichlorostyrene, 14 parts of DL-phenylalanine and 20 parts of methacrylic acid were mixed. After the mixture had been raised to 40° C., 34 parts of anhydrous barium hydroxide was added thereto, and the whole mixture was subjected to reaction for 10 hr. The reaction liquid was cooled down to room temperature and filtered. From the filtrate, water was removed under reduced pressure, whereby a monomer composition was obtained. This composition was subjected to molding in the same manner as in Example 3. The polymer obtained was light yellow and transparent but had such optical properties as refractive index $n_D^{25}$ of 1.615 and an Abbe number of 32. Its light transmittance was 88%.

EXAMPLE 10

27 Parts of styrene, 21 parts of monoethyl phthalate, 20 parts of methacrylic acid and 32 parts of PbO were mixed and subjected to reaction for 10 hr at 60° C. to obtain a transparent and clear monomer composition containing lead. This monomer composition was subjected to molding in the same manner as in Example 1. The polymer obtained had such optical properties as refractive index $n_D^{25}$ of 1.620 and an Abbe number of 32. Its light transmittance was 90%.

EXAMPLE 11

47 Parts of mixed chlorostyrene (ortho/-para=60/40), 13 parts of lead methacrylate, 33 parts of lead hydrocinnamate and 7 parts of methacrylic acid were mixed at 50° C. to obtain a transparent and clear monomer composition. To this composition was added 0.25 part of dimyristyl peroxydicarbonate (Peroyl MSP manufactured by Nippon Oils & Fats Co., Ltd.) as a polymerization initiator and they were mixed. The mixture was poured into a mold made from two sheets of glass and a gasket. The mixture was kept there for 4 hr at 55° C. and further for 3 hr at 90° C. for thermal curing, whereby a transparent polymer was obtained. The polymer had such optical properties as refractive index $n_D^{25}$ of 1.613 and an Abbe number of 31.7 and had good practical usability as a plastic lens. Its light transmittance was 90%.

EXAMPLE 12

30 Parts of styrene, 50 parts of lead methacrylate, 10 parts of lead cinnamate and 10 parts of methacrylic acid were mixed at 60° C. to obtain a transparent and clear monomer composition. To this composition was added 0.2 part of diisopropyl peroxycarbonate as a polymerization initiator and they were mixed. The mixture was subjected to molding in the same manner as in Example 11. The polymer obtained was transparent and had such optical properties as refractive index $n_D^{25}$ of 1.627 and an Abbe number of 27.4. Its light transmittance was 88%.

EXAMPLE 13

50 Parts of mixed chlorostyrene (ortho/-para=60/40), 15 parts of barium acrylate, 20 parts of lead methacrylate, 10 parts of a barium salt of monobenzyl maleate and 5 parts of acrylic acid were mixed at 50° C. to obtain a transparent and clear monomer composition. To this composition was added 0.3 part of dimyristyl peroxydicarbonate as a polymerization initiator, and they were mixed. The mixture was subjected to molding in the same manner as in Example 11. The polymer obtained was transparent and had such optical properties as refractive index $n_D^{25}$ of 1.613 and an Abbe number of 29.6. Its light transmittance was 90%.

EXAMPLE 14

50 Parts of mixed chlorostyrene (ortho/-para=60/40), 5 parts of lanthanum methacrylate, 20 parts of lead methacrylate, 20 parts of a lead salt of monoethyl phthalate and 5 parts of acrylic acid were mixed at 60° C. to obtain a transparent and clear monomer composition. To this composition was added 0.25 part of dimyristyl peroxydicarbonate as a polymerization initiator, and the mixture was subjected to molding in the same manner as in Example 11. The polymer obtained was clear and had such optical properties as refractive index $n_D^{25}$ of 1.622 and an Abbe number of 30.5. Its light transmittance was 88%.

EXAMPLE 15

47 Parts of mixed chlorostyrene (ortho/-para=60/40), 24 parts of lead methacrylate, 24 parts of lead 3-phenoxypropionate and 5 parts of methacrylic acid were mixed at 50° C. to obtain a transparent and clear monomer composition. To this composition was added 0.25 part of dimyristyl peroxydicarbonate and they were mixed. The mixture was subjected to molding in the same manner as in Example 11. The polymer obtained was transparent and had such optical properties as refractive index $n_D^{25}$ of 1.614 and an Abbe number of 32.0. Its light transmittance was 89%.

EXAMPLE 16

47 Parts of bromostyrene, 23 parts of lead methacrylate, 16 parts of lead monobenzyl fumarate and 14 parts of methacrylic acid were mixed at 50° C. to obtain a transparent and clear monomer composition. To this composition was added 0.2 part of diisopropyl diperoxycarbonate as a polymerization initiator and they were mixed. The mixture was subjected to molding in the same manner as in Example 11. The polymer obtained was transparent and had such optical properties as refractive index $n_D^{25}$ of 1.613 and an Abbe number of 31.2. Its light transmittance was 89%.

EXAMPLE 17

47 Parts of mixed chlorostyrene (ortho/-para=60/40), 23 parts of lead methacrylate, 15 parts of lead monobenzyl itaconate and 15 parts of methacrylic acid were mixed at 50° C. to obtain a transparent and clear monomer composition. To this composition was added 0.3 part of dimyristyl peroxydicarbonate as a polymerization initiator and they were mixed. The mixture was subjected to molding in the same manner as in Example 11. The polymer obtained was transparent and had such optical properties as refractive index $n_D^{25}$ of 1.608 and an Abbe number of 32.1. Its light transmittance was 90%.

EXAMPLE 18

47 Parts of mixed chlorostyrene (ortho/-para=60/40), 23 parts of lead methacrylate, 16 parts of lead 3-benzoylacrylate and 14 parts of methacrylic acid were mixed at 50° C. to obtain a transparent and clear monomer composition. To this composition was added 0.25 part of dimyristyl peroxydicarbonate as a polymerization initiator and they were mixed. The mixture was subjected to molding in the same manner as in Example 11. The polymer obtained was transparent and had such optical properties as refractive index $n_D^{25}$ of 1.609 and an Abbe number of 32.0. Its light transmittance was 90%.

EXAMPLE 19

47 Parts of mixed chlorostyrene (ortho/para=60/40), 24 parts of lead methacrylate, 20 parts of a lead salt of bis-(4-methoxyphenyl)acetic acid and 9 parts of methacrylic acid were mixed at 60° C. to obtain a transparent and clear monomer composition. To this composition was added 0.25 part of dimyristyl peroxydicarbonate and they were mixed. The mixture was subjected to molding in the same manner as in Example 1. The polymer obtained was transparent and had such optical properties as refractive index $n_D^{25}$ of 1.618 and an Abbe number of 31.5. Its light transmittance was 89%.

EXAMPLE 20

47 Parts of mixed chlorostyrene (ortho/-para=60/40), 16 parts of lead methacrylate, 30 parts of parachlorophenylacetic acid and 7 parts of methacrylic acid were mixed at 50° C. to obtain a transparent and clear monomer composition. To this composition was added 0.25 part of dimyristyl peroxydicarbonate and they were mixed. The mixture was subjected to molding in the same manner as in Example 11. The polymer obtained was transparent and had such optical properties as refractive index $n_D^{25}$ of 1.616 and an Abbe number of 31.5. It had good practical usability as a plastic lens and its light transmittance was 89%.

COMPARATIVE EXAMPLE 3

60 Parts of mixed chlorostyrene (ortho/para=60/40) and 40 parts of lead methacrylate were mixed at 60° C. Lead methacrylate did not completely dissolve and a part of it precipitated. Therefore, this composition was filtered with heating to remove the precipitate. To 100 parts of the resulting monomer composition (filtrate) was added 0.25 part of dimyristyl peroxydicarbonate and they were mixed. The mixture was poured into the same mold as used in Example 11 and kept for 4 hr at 55° C. and further for 3 hr at 100° C. for heat curing. The polymer obtained was white and semi-transparent and unusable as a plastic lens.

EXAMPLE 21

In 34 parts of 2-hydroxyethyl methacrylate were dissolved 18 parts of acrylic acid and 11 parts of cinnamic acid. After the mixture had been raised to 45° C., 37 parts of barium hydroxide octahydrate [Ba(OH)$_2$·8-H$_2$O] was added thereto slowly and reaction was conducted for 8 hr at 45° C. The reaction liquid was cooled down to room temperature, filtered and subjected to removal of water under reduced pressure (20 mmHg), whereby a monomer composition was obtained. To 100 parts of this composition was added 0.2 part of dimyristyl peroxydicarbonate as a polymerization initiator and they were mixed. The mixture was poured into a mold as used in Example 1 and kept for 3 hr at 60° C. and further for 3 hr at 90° C. for curing to obtain a transparent resin. The resin had such optical properties as refractive index $n_D^{25}$ of 1.556 and an Abbe number of 41. Its light transmittance was 90%.

EXAMPLE 22

In 100 ml of benzene containing 25 parts of 2-hydroxyethyl methacrylate were dissolved 24 parts of acrylic acid, 14 parts of hydrocinnamic acid and 7 parts of cinnamic acid. After the mixture had been raised to 45° C., thereto was slowly added 30 parts of barium hydroxide monohydrate [Ba(OH)$_2$·H$_2$O] obtained by drying barium hydroxide octahydrate in air for 4 days at 90° C. The whole mixture was subjected to reaction for 10 hr at 45° C. From the reaction liquid, water and benzene were removed under reduced pressure, whereby a monomer composition (A) was obtained. To this monomer composition, was further added copolymerizable monomers as shown in the following table, and the mixture was subjected to copolymerization in the same manner as used in Example 21. The resins obtained had optical properties as shown in the following Table.

TABLE

| Run No. | Monomer Composition (part by weight) | Light transmittance ratio (%) | Refractive index ($n_D^{25}$) | Abbe number |
|---|---|---|---|---|
| 1 | Monomer composition (A)/dichlorostyrene (45/55) | 90 | 1.593 | 34 |
| 2 | Monomer composition (A)/chlorostyrene/benzyl methacrylate (37/43/20) | 90 | 1.582 | 36 |
| 3 | Monomer composition (A)/styrene (67/33) | 90 | 1.563 | 40 |
| 4 | Monomer composition (A)/tribromophenyl acrylate (50/50) | 89 | 1.591 | 35 |

What is claimed is:

1. A transparent resin material consisting essentially of a polymer containing metallic atoms (except for alkali metals) which are ionic-bonded to a vitreous copolymer constituting the substance of said resin material, in an amount of at least 8% by weight based on the total weight of the resin material, said resin material having a transparency of at least 80% in terms of light transmittance measured for a test piece of 2 mm thickness, and a refractive index $n_D^{25}$ of at least 1.55, said vitreous copolymer being composed of the following recurring units:
   (a) a residue of a copolymerizable vinly monomer;
   (b) a residue of a carboxylic acid polymer, at least one of the carboxylic groups of the polymer being ionic-bonded through a metallic atom to a carboxylic group of an aromatic carboxylic acid;
   (c) a residue of a carboxylic acid, the acid residue having at least one free carboxylic acid group; and
   (d) a residue of a carboxylic acid polymer which is cross-linked by ion-linkage through a metallic atom.

2. A transparent resin material according to claim 1, wherein the content of metallic atoms ranges between 10 and 40% by weight.

3. A transparent resin material according to claim 1, wherein the transparency is 85% or above in terms of a light transmittance.

4. A transparent resin material according to claim 1, wherein the refractive index $n_D^{25}$ is 1.60 or above.

5. A lens made of a transparent resin material according to claim 1.

6. A light waveguide made of a transparent resin material according to claim 1.

7. An optical fiber made of a transparent resin material according to claim 1.

8. A transparent resin material according to claim 1, wherein the residue of a copolymerizable viny monomer (a) is represented by the general formula

wherein R$_1$ represents a hydrogen atom or a methyl group; and Y represents (1)

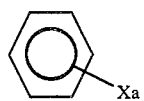

in which X is a hydrogen atom, chlorine atom, bromine atom, iodien atom, methyl group, methoxy group, amino group, nitroro group, phenyl group or phenoxy group, and a is an integer of 1-5; (2)

$$-OOC-(CH_2)_b-OH,$$

in which b is an integer of 1-5; or (3)

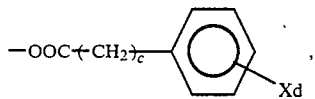

in which X is as defined above, is an integer of 0-1, and d is an integer of 1-5.

9. A transparent resin material according to claim 1, wherein the residue of a carboxylic acid polymer (b) is represented by the general formula

 (2)

wherein M represents a metallic atom, $R_1$ represents a hydrogen atom or a methyl group, $R_2$ represents a group having an aromatic ring and n represents the oxidation number of the metal.

10. A transparent resin material according to claim 1, wherein the residue of a carboxylic acid having at least one free carboxylic group (c) is represented by the general formula

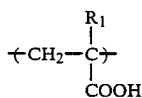 (3)

where $R_1$ represents a hydrogen atom or a methyl group.

11. A transparent resin material according to claim 1, wherein the residue of a carboxylic acid polymer (d) is represented by the general formula

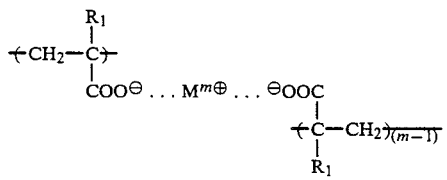 (4)

wherein $R_1$ represents a hydrogen atom or a methyl group and M represents a metallic atom, and m is the oxidation number of the metal.

12. A transparent resin material according to claim 1, wherein the metallic atom is Pb, Ba, Sr, Zn, Sn, Sb, Ca, La, Ti, Zr, Ta, Th, Nb, Tl, Ge or Cs.

13. A transparent resin material according to claim 12, wherein the metallic atom is Pb, Ba, La, Sr, Tl, Sn, or Cs.

14. A transparent resin material according to claim 1, wherein the proportion of the residue of a copolymerizable vinyl monomer (a), the residue of a carboxylic acid polymer (b), the residue of a carboxylic acid having at least one free carboxylic group (c), and the residue of a carboxylic polymer which is cross-linked by ion-linkage through a metallic atom (d) are 10 to 80, 10 to 89, 1 to 20, and 0 to 20% by weight, respectively.

15. A transparent resin material according to claim 1, wherein the proportion of the metallic atom contained in the total resin material is 8 to 50% by weight.

16. A transparent resin material, having a transparency of at least 80% in terms of light transmittance measured for a test piece of 2 mm thickness and a refractive index $n_D^{25}$ of at least 1.55, and consisting essentially of a polymer containing metallic atoms which comprises four kinds of recurring unit represented by the following general formulas [1] to [4]:

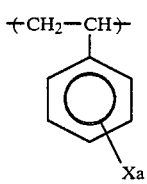 [1]

wherein X is a hydrogen, chlorine, bromine or iodine atom or a methoxy, amino, nitro, phenyl or phenoxy group and a is 1 or 2;

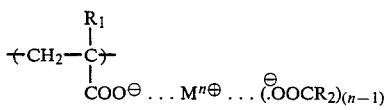 [2]

wherein M is a metal atom, $R_1$ is hydrogen atom or a methyl group, $R_2$ is a group having an aromatic ring and n is the oxidation number of said metal;

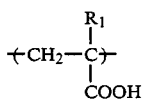 [3]

where $R_1$ is as defined above; and

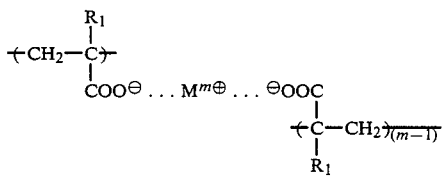 [4]

wherein $R_1$ and M are as defined above and m is the oxidation number of said metal.

17. A process for producing a transparent resin material having a transparency of at least 80% in terms of light transmittance measured for a test piece of 2 mm thickness and a refractive index $n_D^{25}$ of at least 1.55, said transparent resin material consisting essentially of a polymer containing metallic atoms which comprises (1) a step for producing a metal-containing monomer composition comprising reacting at least one monomeric aromatic carboxylic acid, and at least one monomeric carboxylic acid with a metal compound, the total amount of carboxylic acids being more than an equivalent molar amount relative to the oxidation number of the metal of the metal compound, and (2) a step for copolymerizing the metalcontaining monomer composition and at least one copolymerizable vinyl monomer.

18. A process for producing a transparent resin material having a transparency of at least 80% in terms of light transmittance measured for a test piece of 2 mm thickness and a refractive index $n_D{}^{25}$ of at least 1.55, said transparent resin material consisting essentially of a polymer containing metallic atoms which comprises effecting copolymerization of a mixture of
  (a) at least one copolymerizable vinyl monomer,
  (b) at least one monomer of a metal salt of an aromatic carboxylic acid,
  (c) at least one monomer of a metal salt of a carboxylic acid, and
  (d) at least one monomer of carboxylic acid, the at least one monomer of carboxylic acid being contained in an amount such that, in the transparent resin material, free carboxylic acid groups are contained.

19. A process for producing a transparent resin material having a transparency of at least 80% in terms of light transmittance measured for a test piece of 2 mm thickness and a refractive index $n_D{}^{25}$ of at least 1.55, said transparent resin material consisting essentially of a polymer containing metallic atoms which comprises copolymerizing at least one monomer represented by the general formula [I]

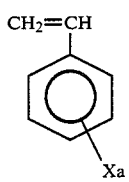

wherein X is a hydrogen, chlorine, bromine or iodine atom or methoxy, amino, nitro, phenyl or phenoxy group and a is 1 or 2; at least one monomer represented by the general formula [II]

wherein M represents a metal atom, $R_2$ is a group having at least one aromatic ring and n is the oxidation number of said metal; at least one monomer represented by the general formula [III]

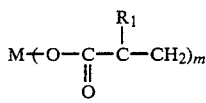

wherein M is as defined above, $R_1$ is a hydrogen atom or a methyl group and m is the oxidation number of said metal; and at least one monomer represented by the general formula [IV]

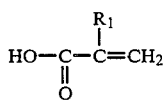

wherein $R_1$ is as defined above, the at least one monomer represented by the general formula [IV] being contained in an amount such that, in the transparent resin material formed, free carboxylic acid groups are contained.

20. A varnish composition comprising a resin composition consisting essentially of:

(a) at lest one copolymerizable vinyl monomer;
  (b) at least one monomer of a metal salt of a carboxylic acid;
  (c) at least one monomer of a metal salt of an aromatic carboxylic acid; and
  (d) at least one monomer of carboxylic acid, the components (a)-(d) of the resin composition being able to be cured to form a transparent resin material having metallic atoms ionic-bonded to a vitreous copolymer, the at least one carboxylic acid being used in an amount such that, in the formed transparent resin material, free carboxylic acid groups are contained, the metallic atoms being contained in the resin material in an amount of 8% by weight based on the total weight of the resin material, the resin material having a transparency of at least 80% in terms of a light transmittance measured for a test piece of 2 mm thickness and a refractive index $n_D{}^{25}$ of at least 1.55.

21. A varnish composition according to claim 20, wherein said varnish composition further includes a polymerization initiator.

22. A varnish composition according to claim 21, wherein said polymerization initiator is at least one selected from the group consisting of a thermal polymerization initiator and a polymerization initiator used in curing by ultraviolet light.

23. A varnish composition according to claim 21, wherein the varnish composition further includes a solvent.

24. A process for producing transparent resin material according to claim 17, wherein, in the step of copolymerizing, initially a polymerization initiator is added to said monomer composition and then the monomer composition is polymerized to form the transparent resin material, having metallic atoms ionic-bonded to a vitreous copolymer, in an amount of at least 8% by weight based on the total weight of the resin material.

25. A process for producing a transparent resin material according to claim 18, wherein the copolymerization is effected by initially adding a polymerization initiator to form the mixture (a)-(d) and said initiator, and then the mixture is polymerized to form the transparent resin material, having metallic atoms ionic-bonded to a vitreous copolymer, in an amount of at least 8% by weight on the total weight of the resin material.

26. A transparent resin material having a transparency of at least 80% in terms of light transmittance measured for a test piece of 2 mm thickness and a refractive index $n_D{}^{25}$ of at least 1.55, said transparent resin material consisting essentially of a polymer containing metallic atoms therein, which comprises a vitreous copolymer composed of the following recurring units:
  (a) a residue of a copolymerizable vinyl monomer;
  (b) a residue of a carboxylic acid polymer, at least one of the carboxylic groups of the polymer being ionic-bonded through a metallic atom to a carboxylic group of an aromatic carboxylic acid;
  (c) a residue of a carboxylic acid, the carboxylic acid residue having at least one free carboxylic acid group; and
  (d) a residue of a carboxylic acid polymer which is cross-linked by ion-linkage through a metallic atoms, the metallic atom being Pb, Ba, Sr, Zn, Sn, Sb, Ca, La, Ti, Zr, Ta, Th, Nb, Tl, Ge, or Cs.

27. A transparent resin material having a transparency of at least 80% in terms of light transmittance measured for a test piece of 2 mm thickness and a refractive index $n_D^{25}$ of at least 1.55, said transparent resin material consisting essentially of a polymer containing metallic atoms therein, which comprises a vitreous copolymer composed of the following recurring units:

(a) a residue of a copolymerizable vinyl monomer;
(b) a residue of a carboxylic acid polymer, at least one of the carboxylic groups of the polymer being ionic-bonded through a metallic atom to a carboxylic group of an aromatic carboxylic acid;
(c) a residue of a carboxylic acid, the carboxylic acid residue having at least one free carboxylic acid group; and
(d) a residue of a carboxylic acid polymer which is cross-linked by ion-linkage through a metallic atom, the metallic atom being Pb.

28. A transparent resin material having a transparency of at least 80% in terms of light transmittance measured for a test piece of 2 mm thickness and a refractive index $n_D^{25}$ of at least 1.55, said transparent resin material consisting essentially of a polymer containing metallic atoms therein, which comprises a vitreous copolymer composed of the following recurring units:

(a) a residue of a copolymerizable vinyl monomer;
(b) a residue of a carboxylic acid polymer, at least one of the carboxylic groups of the polymer being ionic-bonded through a metallic atom to a carboxylic group of an aromatic carboxylic acid;
(c) a residue of a carboxylic acid, the carboxylic acid residue having at least one free carboxylic acid group; and
(d) a residue of a carboxylic acid polymer which is cross-linked by ion-linkage through a metallic atom, the metallic atom being Ba.

29. A transparent resin material having a transparency of at least 80% in terms of light transmittance measured for a test piece of 2 mm thickness and a refractive index $n_D^{25}$ of at least 1.55, said transparent resin material consisting essentially of a polymer containing metallic atoms therein, which comprises a vitreous copolymer composed of the following recurring units:

(a) a residue of a copolymerizable vinyl monomer;
(b) a residue of a carboxylic acid polymer, at least one of the carboxylic groups of the polymer being ionic-bonded through a metallic atom to a carboxylic group of an aromatic carboxylic acid;
(c) a residue of a carboxylic acid, the carboxylic acid residue having at least one free carboxylic acid group; and
(d) a residue of a carboxylic acid polymer which is cross-linked by ion-linkage through a metallic atom, the metallic atom being La.

30. A process for producing a transparent resin material according to claim 17, wherein the total amount of carboxylic acid is 1.03–3.0 times an equivalent molar amount relative to the oxidation number of the metal of the metal compound.

* * * * *